April 10, 1962    A. ARMEN ETAL    3,029,213
FIBER-FORMING GRAFT COPOLYMERS OF VINYL CYANIDE ON
N-VINYL-3-MORPHOLINONE POLYMER SUBSTRATES, THEIR
PREPARATION AND USE
Filed March 3, 1960
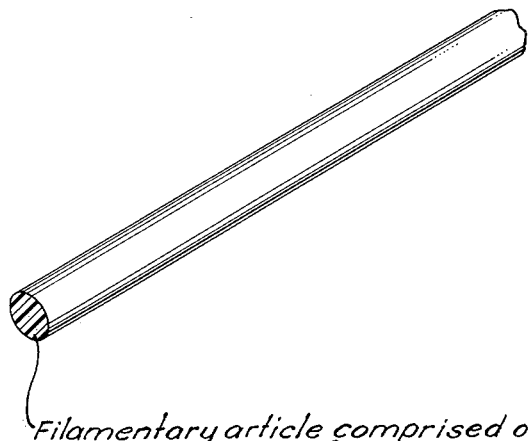
Filamentary article comprised of a
graft copolymer of vinyl cyanide
with an N-vinyl-3-morpholinone
polymer substrate.
INVENTORS.
Ardy Armen
Stanley A. Murdock
Giles R. Cokelet
BY Jerome Kudy
THEIR ATTORNEY 3,029,213
FIBER-FORMING GRAFT COPOLYMERS OF VINYL CYANIDE ON N-VINYL-3-MORPHOLINONE POLYMER SUBSTRATES, THEIR PREPARATION AND USE
Ardy Armen, Denbigh, Va., Stanley A. Murdock, Concord, Calif., and Giles R. Cokelet, Williamsburg, Va., assignors to The Dow Chemical Company, Midland, Mich., a corporation of Delaware
Filed Mar. 3, 1960, Ser. No. 12,570
29 Claims. (Cl. 260—29.6)

The present invention contributes to the organic polymer art and relates to a method for the preparation of improved fiber-forming systems comprising certain varieties of polymeric substances and aqueous, polyacrylonitrile-solvent, saline solutions and to the resulting compositions obtainable thereby, as well as to the use of such compositions for fiber-forming and the like purposes.

Diversiform techniques are available for enhancing and upgrading various properties, particularly the dye-receptivity, of fibers and related shaped articles including filaments, strands, yarns, tow, threads, cords and other funicular structures, ribbons, tapes, films, foils, sheets and the like which are manufactured from synthetically prepared polymeric substances. In order to avoid tautologism and for purposes of convenient illustration, the invention will hereinafter be imminently described in particular association with fibers, although it is equally adaptable to any of the shaped articles related thereto.

According to several frequently-employed conventional practices for improving fiber properties, calculated incorporations of functional ingredients or additaments in fiber-forming compositions may impart specific desired characteristics in varying degrees to the fiber which may be obtained from the composition. Such ingredients may be in the form of monomeric materials, having the desired functional utility, which are interpolymerized or randomly copolymerized with other monomeric materials, having superior fiber-forming characteristics, to form conventional extrudable copolymeric substances. The conventional copolymeric substances obtained in this manner have substantially homogeneous molecular structures in which the different interpolymerized monomeric materials are arranged in a more random and statistical manner of distribution in the copolymer molecule. Alternatively, the additament ingredients may be in the form of polymeric or other substances employed for their beneficial effect in extrudable mixtures or blends with other polymeric substances which may have superior or more desirable fiber-forming characteristics.

In either instance, difficulties may frequently be encountered. Thus, the incorporated ingredient may have inferior fiber-forming characteristics and may even spoliate the superior fiber-forming properties of the composition. Such quid pro quo is often evident in fibers manufactured from copolymeric substances or from blended polymeric substances in which a particular characteristic, such as dye-receptivity, has been agumented at the expense of other valuable and desirable intrinsic properties such as melting point, tensile strength, extensibility, flexibility, hand (i.e., "feel" to the touch), or the like. In addition, especially when mixed or blended polymeric substances are involved, it is often awkward and arduous to properly and satisfactorily incorporate a desired ingredient in the fiber-forming composition. This may particularly be the case if the additive is insoluble in or essentially immiscible with the composition. It may likewise be difficult to obtain uniform and stable distribution of the interblended ingredients throughout the composition or the fiber product which may be obtained therefrom, or to permanently retain the desired inter-blended additament ingredient or ingredients in the fiber product manufactured from the mixed polymer composition. The last mentioned effect may particularly be involved when the functional ingredients (such as water-soluble polymeric additaments) are susceptible to being leached or otherwise removed from the fiber during its processing or other subsequent usage.

Many of the difficulties attendant the incorporation of functional ingredients in fiber-forming compositions may frequently be precluded by employing a spinnable graft or block copolymer. Such a product may advantageously be prepared by polymerizing a desired fiber-forming monomeric material in the presence of an already or preformed "backbone" polymeric material or substrate having a desirable functional utility, such as superior dye-receptivity. The resultant graft copolymer can not be separated into its constituent parts by physical methods. It may be further characterized as having a substantially heterogeneous molecular structure in which a non-statistical distribution of the interpolymerized materials is obtained due to the arrangement of chemically linked substituent chains of different polymeric materials.

As in the case of other polymeric substances, graft copolymer products are ordinarily separately prepared before being utilized in fiber-forming compositions.

In particular, therefore, this invention relates to a method for the preparation of improved fiber-forming systems comprising polymeric substances, including graft copolymers comprised of certain particularly advantageous preformed N-vinyl heterocyclic polymer substrates, and aqueous, polyacrylonitrile-solvent, saline solutions and to the compositions which thereby may be obtained. It has more specific reference to the preparation of such systems with vinyl cyanide (i.e., acrylonitrile) and like ethylenically (advantageously monoethylenically) unsaturated monomeric materials.

It is among the principal objects of the present invention to provide an expedient and simplified method for the preparation of fiber-forming systems, and fibers and other shaped articles therefrom, comprised of vinyl cyanide-containing grafted or blocked copolymeric substances having, as backbone substrates therein, certain highly desirable and particularly advantageous pre-formed N-vinyl heterocyclic constituents, as hereinafter more fully identified.

It is an additional object to provide a method wherein the grafted copolymeric substance may be obtained directly in the fiber-forming system.

A further object of the invention is to provide fiber-forming compositions and fibers and other shaped articles therefrom which are benefited by the incorporation of certain functional, pre-formed, N-vinyl heterocyclic polymer ingredients having specific desired effects, particularly as regards enhanced dye-receptivity and anti-static characteristics, in articles prepared from such compositions without sacrificing or susbtantially diminishing other valuable intrinsic characteristics and properties in structures and articles which may be cast, extruded or otherwise shaped or formed from such compositions.

Additional objects and many cognate advantages will be apparent throughout the description and specification which follows.

According to the present invention, improved fiber-forming systems may be obtained by dissolving vinyl cyanide, or a mixture of vinyl cyanide and another monoethylenically unsaturated monomeric material that is polymerizable with vinyl cyanide, in an aqueous, saline solution that is a solvent for polyvinylcyanide or, as it is known, polyacrylonitrile (i.e., a polyacrylonitrile-solvent, saline solution); then dissolving in the solution which is formed, as a preformed "backbone" or substrate polymeric material having the desired functional utility, including dye-receptivity and antistatic characteristics, an N-vinyl-3-morpholinone polymer, which is soluble in the solution of the monomeric material in the aqueous saline solvent and, oftentimes, is directly soluble in the aqueous polyacrylonitrile-solvent, saline solution employed without requiring the preliminary presence of monomeric vinyl cyanide to assist in the dissolution; and then polymerizing the dissolved monomeric material in the presence of the dissolved N-vinyl-3-morpholinone polymer substrate to form a fiber-forming, graft copolymer-containing polymeric substance in spinnable dispersion and frequently (with significant advantage) in true solution in said aqueous, polyacrylonitrile-solvent, saline solution.

The compositions which thus may be obtained are comprised of polymers and copolymers of the vinyl cyanide-containing monoethylenically unsaturated monomeric material and graft copolymers of the vinyl cyanide-containing monoethylenically unsaturated monomeric material with the functional N-vinyl-3-morpholinone polymer substrate which are dissolved (or sometimes merely efficiently and effectively dispersed, depending on the precise constituents employed) in a spinnable fiber-forming condition in the aqueous, saline solution that is a solvent for polyacrylonitrile.

The compositions thus obtained may advantageously be spun or extruded directly as they are prepared, generally in a manner pursuant to conventional wet-spinning techniques in analogy with known salt-spinning procedures. Or they may otherwise be cast or formed directly into fibers and other shaped structures and articles having substantially undiminished properties and characteristics which have been enhanced and improved by the incorporation of the functional N-vinyl-3-morpholinone polymer as a substrate in the graft copolymer component of the composition. Further, the functional N-vinyl-3-morpholinone polymer ingredient which is contained in fibers and the like prepared from such compositions is more permanently incorporated and retained in the the fiber product throughout processing and treatment and other subsequent application of the fiber, even though the N-vinyl-3-morpholinone polymer is ordinarily of a considerably soluble and relatively easily extractable nature.

The compositions obtained by practice of the present invention, and which are herein referred to as graft copolymer-containing compositions, are readily distinguishable by their different properties from analogous compositions, among which are polymer blends, even though a similarity in the respective involved empirical chemical compositions may obtain.

As indicated, the graft copolymer-containing polymeric compositions are directly obtained in a condition suitable for spinning with excellent and stable distribution throughout the composition and exceptional resistance to separation therefrom prior to their extrusion into desired shaped articles. The compositions obtained, as has been mentioned, are frequently dissolved, depending to some extent upon the quantity and more directly on the specific nature of the graft copolymer present. In any event, the polymeric products of the present invention, when not actually completely soluble in the solvent medium, are at least obtained in the form of very fine dispersions having many of the characteristics of true emulsions due to the presence of the graft copolymer in the aqueous saline phase as spherical particles in the form characteristic of liquid droplets.

As mentioned, the ethylenically unsaturated monomeric material which is employed for forming the graft copolymer is all or substantially all vinyl cyanide. As indicated, mixtures of desired monomeric substances which are soluble in aqueous, polyacrylonitrile-dissolving saline solutions, particularly mixtures containing predominant proportions (i.e., more than half) of vinyl cyanide, may also be employed in order to form copolymeric substituents in and with the graft copolymer. It is advantageous for the ethylenically unsaturated monomeric material to comprise at least about 80 weight percent of the polymerizable and graft copolymerizable ingredients employed, including the quantity of N-vinyl-3-morpholinone polymer substrate that is present and combined in the graft copolymer, based on the total weight of interpolymerizable monomeric and polymeric constituents present in the system. Preferably, a sufficiency of vinyl cyanide is employed to insure that the resulting polymerized substance, including the graft copolymer which is formed, contains in the polymerized substance product at least about 80 weight percent of polymerized vinyl cyanide. Other monomeric materials which may advantageously be employed with vinyl cyanide in the practice of the present invention in order to prepare highly desirable mixed graft products include allyl alcohol, vinyl acetate, vinyl propionate, vinyl butyrate, methacrylamide, methyl acrylate, ethyl acrylate, 2-vinyl pyridine, dimethyl aminoethyl acrylate, methacrylonitrile, acrylic acid, butadiene, itaconic and fumaric acids, vinyl acetic acid, fumaronitrile, 2-vinyl-5-ethyl-pyridine, ethylene sulfonic acid and its alkali metal salts, allyl sulfonic acid and its alkali metal salts, styrene sulfonic acid and its alkali metal salts, sulfonated vinyl toluene and other sulfonated vinyl aryl monomers and the like, including any one or more of the many other monomeric substances well known to the art capable of being copolymerized with acrylonitrile to form fiber-forming polymer products.

While homopolymeric, non-ring-substituted N-vinyl-3-morpholinone may be employed with great advantage as the preformed "backbone" N-vinyl-3-morpholinone polymer substrate, other N-vinyl-3-morpholinone polymers (particularly the water-soluble variety) may also be utilized with benefit in the practice of the present invention. These include polymer products of various of the alkyl and other ring-substituted derivatives of N-vinyl-3-morpholinone.

The N-vinyl-3-morpholinone polymers that are utilized in the practice of the present invention, especially when they have been derived from unsubstituted N-vinyl-3-morpholinone, have, as an essential constituent of their polymeric structure, characterizing proportions of the recurring group:

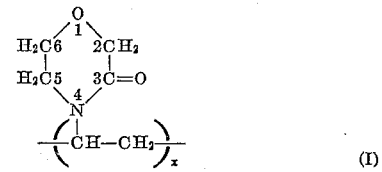

(I)

wherein $x$ is a plural integer, preferably one whose numerical value is at least 5 or 10, frequently in excess of 50, and may be as large as 1,000–2,000 or more. Of course, as has been indicated, the polymers that may beneficially be employed as dye-assisting preformed "backbone" polymer substrates in the practice of the invention may also be derived from substituted N-vinyl-3-morpholinone monomers of the structure:

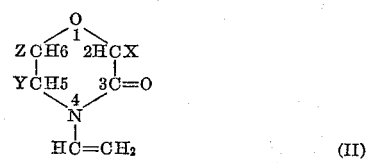

(II)

in which each of the X, Y and Z substituents can independently be either hydrogen, alkyl and haloalkyl substituents containing from 1 to about 4 carbon atoms with the limitation that at least one of them must be alkyl or haloalkyl. Typical of such substituted monomers from which satisfactory polymers and copolymers may be derived are N-vinyl-5-methyl-3-morpholinone; N-vinyl-5-ethyl-3-morpholinone; N-vinyl-5-butyl-3-morpholinone; and equivalent 2- or 6-substituted derivatives as well as like derivatives with plural (i.e., up to three) ring substituted alkyl groups; and analogous derivatives with one or more halo-alkyl (such as chloromethyl, bromoethyl, etc.) substituent groups.

If desired, copolymers of various N-vinyl-3-morpholinone monomers within the scope of the above-indicated Formulae I and II may be employed as the preformed polymer substrate for practice of the present invention. Or, alternatively, use may be made for the indicated purpose of still other copolymers (especially those soluble in water at normal room temperatures, i.e., 20–25° C.) of one or more N-vinyl-3-morpholinone monomers with one or more other ethylenically unsaturated monomeric materials that are copolymerizable with N-vinyl-3-morpholinone monomers to form water-soluble N-vinyl-3-morpholinone copolymer products. Thus, copolymers of N-vinyl-3-morpholinone and: N-vinyl-2-pyrrolidone; N-vinyl-caprolactam; N-vinyl piperidone and other N-vinyl-lactams; N-vinyl-2-oxazolidinone; N-vinyl-5-methyl-2-oxazolidinone and other N-vinyl cyclic carbamates; N-vinyl-succinimide; vinyl acetate, and the like may be suitable for application for present purposes. In cases where copolymers of N-vinyl-3-morpholinones and diverse ethylenically unsaturated comonomers are employed, it is generally advantageous for the copolymer to contain polymerized therein at least about 50, and preferably at least about 80, weight percent of the essential N-vinyl-3-morpholinone monomer constituent which, beneficially, is unsubstituted N-vinyl-3-morpholinone.

In this connection, the hydrogen (or other terminal units) which occur in the homopolymeric and copolymeric N-vinyl-3-morpholinone polymers which may be utilized in the practice of the present invention are not shown in the above-represented generic Formulae I and II since such details are readily understood by the artisan.

The solubility of the N-vinyl-3-morpholinone polymer in water and in the aqueous, polyacrylonitrile-dissolving, saline solutions and monomer-containing mixtures thereof employed in practice of the present invention depends, as indicated, on the precise species and relative quantity of the polymerized N-vinyl-3-morpholinone monomer in the N-vinyl-3-morpholinone polymer product utilized. Poly-N-vinyl-3-morpholinone and the presently contemplated copolymers of non-ring-substituted N-vinyl-3-morpholinone are generally soluble in water and the other liquid media encountered. The polymerized vinyl cyanide-containing graft copolymer products thereof are, likewise, generally entirely soluble in the aqueous saline solvents involved. There is a tendency for water and other solvent solubility to diminish in correlation with the extent and ponderosity of the substituents in ring-substituted N-vinyl-3-morpholinone polymers, although any of them useful for present purposes are invariably soluble in at least the monomer-containing aqueous saline solvent mixture used for the graft copolymerization. Graft copolymer products of certain ring-substituted N-vinyl-3-morpholinone polymer substrates may, accordingly, also exhibit diminished solubility in the aqueous saline solvents employed. Here again, however, they are invariably obtained, as indicated, in at least very efficient and satisfactorily spinnable dispersion. Solubility of the N-vinyl-3-morpholinone polymer in the polymerization system also tends to vary somewhat with the quantity of vinyl cyanide originally present therein. And, as might be anticipated, solubility of the graft copolymer product in the aqueous saline solvent, particularly when ring-substituted N-vinyl-3-morpholinone polymer substrates are employed, may also depend on the presence and specific nature of other polymerized ethylenically unsaturated monomeric materials that may be used in combination with the vinyl cyanide for preparation of the desired fiber-forming, graft copolymer-containing polymer product.

The N-vinyl-3-morpholinone polymers that are so advantageously employed as preformed polymer substrates for preparation of vinyl cyanide graft copolymers in the practice of the present invention, particularly poly-N-vinyl-3-morpholinone and its monomethyl and monoethyl ring substituted homologues, are obtained by polymerizing the monomeric N-vinyl-3-morpholinone, or a mixture thereof with another desired monomer, under the influence of a free radical generating catalyst either in bulk or solution, or by thermal polymerization. This is advantageously in accordance with the disclosure in the copending application for United States Letters Patent of Billy E. Burgert, entitled "N-Vinyl-3-Morpholinone Compounds" having Serial No. 692,587 (now U.S. 2,987,509) which was filed on October 28, 1957. Such a method of preparation quite readily can be conducted to result in obtaining satisfactory N-vinyl-3-morpholinone polymers that are initially formed having Fikentscher K-values much greater than 5–10 to as high as 75–100 or more.

The Fikentscher K-value of a polymeric substance is a quantity, as has been defined by Fikentscher in Cellulosechemie, 13, 60 (1932), that represents an approximate measure of the weight fraction of a given sample of polymer in an infinitesimal molecule weight range. According to a concept that is widely acceptable to those skilled in the art, it may be said to be in correlation, in an exponential manner, to the mean average molecular weight that obtains in a given sample of a polymer substance.

Advantageously, the N-vinyl-3-morpholinone polymers employed as the "backbone" trunk or substrate constituents for the fiber-forming graft copolymers prepared in the practice of the present invention have a number average molecular weight in the range from 10,000 to 20,000 or higher (as determinable from Fikentscher K-values from 5–10 or more to as high as 75 or 100 or so). Preferably, the N-vinyl-3-morpholinone polymers employed have Fikentscher K-values between about 30 and about 60.

It is ordinarily advantageous to employ sufficient quantities of the monomeric materials and the polymeric materials which are graft copolymerized to provide a fiber-forming composition containing between about 2 and 20 weight percent of dissolved or otherwise dispersed polymer in the resulting spinning solution. Usually, an amount of graft copolymerizable constituents sufficient to provide from about 5 to about 17 weight percent of polymeric solids is even more advantageous. Frequently, it may be most suitable for the quantity of graft copolymerizable constitutents that is employed to be adapted to provide from about 8.5 to 11.5 percent by weight of fiber-forming polymer in the resulting spinning solution, taking into account the degree of monomer to polymer conversion that is obtained in the course of the polymerization.

In connection with this, as is readily appreciated by those having the skill of their calling, the graft copolymer containing polymeric compositions of the present invention may, and frequently do, contain certain proportions of non-grafted polymer products. Thus, when vinyl cyanide is independently employed as the monomeric constitutent charged to the polymerization mass, a certain (usually minor) proportion of polyacrylonitrile may be obtained in the resulting polymerized polymer product. Likewise, if the monomeric charge comprises vinyl cyanide and other copolymerizable monomer, the resulting polymer product, in addition to the graft copolymer constituent, may contain some quantity of not only polyacrylonitrile and a homopolymer of the other monomer, but a random copolymer of the vinyl cyanide and the other monomer not grafted on the N-vinyl-3-morpholinone polymer substrate. In addition, very small quantities of non-grafted N-vinyl-3-morpholinone polymer may also remain and be obtained in the resulting graft copolymer-containing polymer product. In any event, the proportion of actual graft copolymer in the polymer product is generally at least about 1–2 weight percent, based on the total weight of polymer solids in the graft copolymer-containing polymer product obtained, depending, of course, on the proportion of N-vinyl-3-morpholinone polymer substrate initially contained in the polymerization mass. Oftentimes, almost all of the polymerization product (i.e., 90–95 weight percent), if not all, is obtained in the form of actual graft copolymer, although ordinarily (depending, again, on initial charge), between about 10 and 80 weight percent of the polymer solids is graft copolymer. Usually, at least half and frequently all of the N-vinyl-3-morpholinone polymer substrate employed is converted in the polymerization to a graft copolymer with the thereon polymerized vinyl cyanide or vinyl cyanide-containing mixture.

The aqueous, polyacrylonitrile-solvent, saline solutions, which are ubiquitously employed in the practice of the present invention for dissolving the monomeric and sometimes the polymeric materials or for forming the monomer-containing dissolving solution for the polymeric materials and as vehicles for their polymerization and also as the dispersing or dissolving media in the fiber-forming compositions which may be obtained, may advantageously be the known and commonly employed saline solutions and compositions which are useful as both the polymerization media and as the spinning solution solvents for various polymers and copolymers of vinyl cyanide containing predominant proportions of polymerized vinyl cyanide in the polymer molecules. Ordinarily they are concentrated aqueous solutions of salts or mixtures of salts, as disclosed in United States Letters Patent Nos. 2,140,921 and 2,425,192. Thus, among the inorganic salts whose aqueous solutions (at adequate concentrations) form solvents for polymers of vinyl cyanide, including polyacrylonitrile and other fiber-forming and other vinyl cyanide polymers, are the thiocyanates of aluminum, calcium and antimony, the bromides of lithium and tin, the chlorides of zinc, nickel and manganese, and so forth. Quite satisfactory polyacrylonitrile-solvent aqueous saline solvents may be prepared, for example, to contain at least about 55 weight percent, based on solution weight of zinc chloride and the like. They also may be mixtures of salts prepared according to the disclosures contained in United States Letters Patent Nos. 2,648,592; 2,648,593; 2,648,646; 2,648,-647; 2,648,648 and 2,648,649. A polyacrylonitrile-solvent solution comprised of about 60 parts by weight of zinc chloride in about 40 parts by weight of water may be utilized with especial advantage.

The polymerization of the monoethylenically unsaturated vinyl cyanide-containing monomeric material in the presence of the dissolved N-vinyl-3-morpholinone polymer substrate to form the graft copolymer-containing polymeric substance may be effected according to such various conventional techniques, as may be suitable or desired in particular instances. The polymerized product, as mentioned, is quite often entirely soluble, without gel formation or other undesirable characteristics in the saline solutions employed, especially when a non-ring-substituted N-vinyl-3-morpholinone polymer, particularly poly-N-vinyl-3-morpholinone, is utilized as the preformed polymer substrate for the graft copolymer product that is made. Sometimes, however, the excrescence of certain monomeric materials during their graft copolymerization as a chemically attached chain to the N-vinyl-3-morpholinone polymer substrate, or the use of relatively extensively or considerably ring substituted N-vinyl-3-morpholinone polymers as substrates, or both, may yield a graft copolymer constituent in the polymerized product which is not completely soluble in the polyacrylonitrile-dissolving aqueous saline solution. However, as has been indicated, even with such an occurrence in the compositions which are prepared according to the method of the present invention, the graft copolymer-containing product is discretely obtained as an extremely fine and uniform dispersion, generally in the form of liquid droplets distributed uniformly throughout the aqueous saline solvent phase, which generally does not interfere with the spinnability of the composition through ordinary fiber-shaping orifices or with the fiber-forming characteristics of the system. The compositions of the present invention may usually be utilized in a conventional manner to prepare high quality fibers and the like in which the desired increase in dye-receptivity has been improved by incorporation of the N-vinyl-3-morpholinone polymer substrate for the graft copolymer constituent of the composition.

As further modification within the scope and purview of the present invention, the polyacrylonitrile-solvent, graft copolymer-containing solutions may be blended or mixed with similar polyacrylonitrile-solvent solutions containing polymerized vinyl cyanide or copolymers of vinyl cyanide containing at least about 80 weight percent of polymerized vinyl cyanide in the polymer product to form yet additionally blended spinnable solutions or dispersions. When such blended compositions are prepared it is advantageous, as is the case with unblended graft copolymer products, for about the same ranges of total dispersed polymer solids to be employed in the blended compositions and for the polymeric constituent to be comprised of between about 1 and 20 weight percent of the N-vinyl-3-morpholinone preformed polymer substrate, based on total weight of polymer solids. More advantageously, between about 6 and 15 weight percent of the N-vinyl-3-morpholinone polymer substrate is present in the total polymer solids of the compositions.

The fiber-forming compositions and systems of the present invention may be spun most conveniently into fibers and the like according to procedures and techniques which are commonly practiced with fiber-forming compositions that are comprised of polyacrylonitrile-dissolving aqueous saline solutions. When zinc chloride or a mixture thereof is employed in the saline solvent, the coagulation and spinning may advantageously be performed in accordance with the manner of operation set forth in United States Letters Patent No. 2,790,700. Thus, by way of illustration, compositions may be coagulated in more dilute, non-polymer-dissolving aqueous solutions (as coagulation or spin baths) of the same or a similar and equivalent salt as employed in the solvent component of the spinnable, fiber-forming composition. The coagulated extrude may then be processed after coagulation according to conventional techniques of washing, stretching, drying, finishing, and the like. If it is desired or preferred, however, other methods as may occur to those skilled in the art which may be suitable for spinning or extruding such compositions into fibers and related articles may also be employed. Or, as has been indicated, the articles may be cast or otherwise formed into desired filamentary or film products.

The graft copolymer fiber products in accordance with the present invention (one of which is schematically illustrated in the sole figure of the accompanying drawing) have excellent physical properties and other desirable characteristics for a textile material, including innate beneficially low tendency to accumulate charges of static electricity on handling, especially in comparison with ordinary unmodified acrylonitrile polymer fibers. They also, as has been indicated, have a high capacity for and are readily and satisfactorily dyeable to deep and level shades of coloration with any of a wide variety of dyestuffs. For example, they may be easily and successfully dyed according to conventional procedure using acid, vat, acetate, direct, naphthol and sulfur dyes.

Such dyestuffs, by way of didactic illustration, as Calcocid Alizarine Violet (Colour Index 61710, formerly Colour Index 1080), Sulfanethrene Red 3B (Colour Index Vat Violet 2), Amacel Scarlet GB (Colour Index 11110—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61) Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid milling Red 3R (Colour Index Acid Red 151), Alzarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs at Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the graft copolymerized preformed N-vinyl-3-morpholinone polymer substrate in a permanent manner, for all practical purposes, despite repeated exposure and subjection to washing, laundering and dry cleaning treatments.

The invention is further exemplified in and by the following docent illustrations in which, unless otherwise indicated, all parts and percentages are to be taken by weight.

*First Illustration*

About 100 grams of poly-N-vinyl-3-morpholinone (PVM) were dissolved in 4560 grams of 58.5 percent zinc chloride solution. About 371 grams of monomeric vinyl cyanide was then added to this solution. The resultant solution was cooled to 0° C. and about 14.8 grams of α,α'-azodi-isobutyronitrile (AIBN) were added thereto. The catalyzed solution was fed, at a rate of about 3680 milliliters per hour, into a jacketed, stirred reactor which was maintained at about 70° C. The solution volume in the reactor was kept at about 1540 milliliters by use of a level control system which operated the reactor exit valve. After four reactor volumes had been passed through the reactor at steady operating conditions, the reaction was terminated by adding 0.35 gram of cupric chloride (dissolved in about 10 milliliters of zinc chloride solution) to the reactor The reactor contents were drained into a debubbling jar and the excess monomer and dissolved air were removed under vacuum.

From the resultant polymer solution it was found that the reaction had converted about 60.4 percent of the monomer to polymer. The graft polymer had a molecular weight of about 120,000. The finally-obtained polymer solution contained about 6.63 percent polymer dissolved therein.

A blend composed of about 130 parts of the graft polymer solution and 100 parts of a 9.05 percent polyacrylonitrile (PVCN) solution (60 percent zinc chloride solution solvent) was made and wet spun into fibers by extrusion and coagulation thereof in an aqueous 42.8 percent zinc chloride solution at about 10° C. The fibers thereby formed were stretched to a length about 13.2 times their original extruded length (i.e., a 13.2×stretch ratio was employed). The stretched fibers were then washed and dried. The (dry) physical properties of the resulting fiber product were as follows:

Denier _____ 2.2
Tenacity _____grams/denier__ 3.1
Elongation _____percent__ 39
Yield _____ 0.70
Modulus (Young's)_____ 31

*Second Illustration*

The last 1500 milliliters of polymer solution to leave the reactor in the First Illustration, prior to the addition of the cupric chloride, was allowed to finish polymerizing at room temperature. This graft copolymer-containing polymer product had a molecular weight of about 93,000 and the resulting polymer solution contained about 7.6 percent of dissolved polymer. The polymer solution was debubbled to remove excess monomer and air. A blend was made of about 850 grams of the graft polymer solution and 1650 grams of the PVCN solution described in the First Illustration.

Spinning conditions used for preparation and properties of the resultant fibers were:

Coagulation bath: Concentration 40.6 percent $ZnCl_2$, temperature 14° C.
Stretch ratio: 14.7×
(Dry) fiber physical properties:
    Denier _____ 2.2
    Tenacity _____grams/denier__ 2.9
    Elongation _____percent__ 44
    Yield _____ 0.76
    Modulus (Young's)_____ 24.5

The dried fibers were dyed to deep and level shades of coloration with Calcodur Pink 2BL (Colour Index Direct Red 75) in the conventional manner, after which their numerical reflectance value in the dyed state was determined. Their reflectance value was about 34. In contrast, fibers spun under similar conditions from the aqueous 60 percent zinc chloride solution containing 9.05 percent PVCN (described in the First Illustration) had a Calcodur Pink 2BL reflectance value of 89.

The above-mentioned dyeings with Calcodur Pink 2BL were each performed at the 2 percent level according to conventional procedure, in which the fiber sample was maintained for about one hour at the boil in the dye bath which contained the dyestuff in an amount equal to about 2 percent of the weight of the fiber (OWF). The dye bath also contained sodium sulfate (i.e., Glauber's salt) in an amount equal to about 15 percent OWF and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from 0 to 100 was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for vinyl cyanide polymer fibers dyed with 2 percent Calcodur Pink 2BL is generally considered by those skilled in the art to be representative of a degree of dye-receptivity that readily meets or exceeds the most rigorous practical requirements and is ordinarily assured of receiving general commercial acceptance and approval.

*Third Illustration*

About 21 grams of PVM with a Fikentscher K-value of about 52 were dissolved in 1900 grams of aqueous 58.5 percent zinc chloride solution, together with about 342 milliliters of vinyl cyanide. The solution was stirred and brought to 50° C. About 11.7 milliliters of 4.7 percent hydrogen peroxide ($H_2O_2$) were added as catalyst or initiator. The reaction was allowed to go to 72 percent conversion before it was stopped with cupric chloride. The weight average molecular weight of the resulting graft copolymer product was approximately 142,000. The graft copolymer contained about 9.6 percent graft copolymerized PVM.

The graft copolymer solution was then wet spun into an aqueous 43.2 percent zinc chloride solution; the formed fibers were stretched about 14:1 (i.e., imparted a 14 × stretch ratio); washed; and dried. The resulting 2.6 denier fibers had the following (dry) properties:

Tenacity _____grams/denier__ 2.6
Elongation _____percent__ 24
Yield _____ 0.77

When the fibers were dyed with Calcodur Pink 2BL (as described in the Second Illustration) they took on the dyestuff with deep and uniform coloration and had a reflectance value of 21.

*Fourth Illustration*

Fiber samples similar to those delineated in the First, Second and Third Illustrations were prepared according to the procedures therein set forth. The subsequent Table I shows the advantageous results of these experiments which were designed and performed to include variations in polymer preparation and spinning conditions. The spinning solutions were all prepared in approximately 60 percent aqueous zinc chloride solutions.

The reaction mixture was polymerized at 50° C. for about four hours, producing an extremely viscous graft copolymer solution. About 1490 grams of aqueous 58.5 percent $ZnCl_2$ solution were added to the product polymer solution in order to dilute the viscous solution to about 7 percent dissolved polymer, based on total weight of solution.

The diluted solution was spun into an aqueous 44.8 percent $ZnCl_2$ coagulating bath at approximately 8° C. The resulting fibers were given an 11.6:1 stretch; washed; and then dried. They had the following physical properties, measured with the fibers in a dry condition:

Denier _____ 3.4
Tenacity _____grams/denier__ 3.4
Elongation _____percent__ 25
Yield point _____grams__ 1.17

*Sixth Illustration*

A graft copolymer, prepared by copolymerizing vinyl cyanide and sodium styrene sulfonate (SSS) in the presence of a preformed polymer of N-vinyl-3-morpholinone, was made from the following charge:

| | Grams |
|---|---|
| Aqueous 58.5 percent $ZnCl_2$ solution | 3150 |
| PVM | 10.3 |
| SSS | 18.6 |
| VCN | 310 |
| AIBN | 3.29 |

The graft copolymerizable, mixed monomer-containing solution was heated to 50° C. The monomers were then allowed to synthermally polymerize on and in the presence of the PVM substrate for four hours.

The resulting polymer solution was divided and separately spun into fiber products of different denier using a 42.2 percent aqueous $ZnCl_2$ coagulating bath at approximately 5° C. for each. The coagulated fibers were washed, stretched about 17 to 1, and dried at 120° C. for about six minutes. Filaments of good fiber quality were produced having the following physical properties:

| | | |
|---|---|---|
| Denier | 2.2 | 1.5 |
| Tenacity (grams/denier) | 3.2 | 4.4 |
| Elongation (percent) | 31 | 34 |
| Yield point (grams) | 0.62 | 0.80 |
| Young's modulus | 42 | 42 |

The fibers were dyed to a bright red with 2 percent (OWF) Sevron Brilliant Red 4G (Colour Index Basic Red 14) at 95° C. for two hours. The dyed fibers exhibited excellent light fastness, showing a very slight

TABLE 1

| Experiment | Percent PVM in $ZnCl_2$ Solution | K-Value of PVM | Catalyst | PVM/ VCN Ratio | Percent Conversion of VCN to PVCN | Approx. Weight, Average Molecular Weight | Blended w/PVCN Solution Before Spinning | Percent PVM Total Polymer Spin | Percent $ZnCl_2$ In Spin Bath | Spin Bath Temp., ° C. | Calcodur Pink 2BL Reflectance Value of Fiber Product |
|---|---|---|---|---|---|---|---|---|---|---|---|
| "A" | 1.0 | 48 | $H_2O_2$ | 1:9 | 88 | 134,000 | No | 11.2 | 42.5 | 14 | 38 |
| "B" | 4.35 | 39 | $H_2O_2$ | 1:4 | 54 | 79,000 | Yes | 9.0 | 43.1 | 15 | 30.4 |
| "C" | 0.96 | 47 | $H_2O_2$ | 1:13 | 87 | 111,000 | No | 8.1 | 44.7 | 11 | 53 |
| "D" | 2.02 | 52 | AIBN | 1:3.7 | 60.4 | 80,000 | Yes | 10 | 42.8 | 10 | 45.6 |
| "E" | 2.02 | 52 | AIBN | 1:3.7 | 60.4 | 80,000 | Yes | 15 | 42.6 | 10 | 4.2 |
| "F" | 2.02 | 52 | AIBN | 1:3.7 | 66 | 56,000 | Yes | 6 | 40.6 | 14 | 34 |
| "G" | 0.98 | 46 | $SO_2+K_2S_2O_8$ | 1:11 | 70 | | Yes | 6 | 42.2 | 15.8 | 33.2 |

*Fifth Illustration*

The following reaction mixture was used to produce a co-graft of vinyl cyanide (VCN) and methyl acrylate (MeAk) on PVM:

| | Grams |
|---|---|
| Aqueous 58.5 percent $ZnCl_2$ soln | 3150 |
| PVM | 20.6 |
| MeAk | 18.6 |
| VCN | 310 |
| AIBN | 2.29 | break only after 100 hours of ultraviolet light exposure under standard test conditions in a Fadometer.

Results similar to those obtained in the foregoing may be achieved using other of the N-vinyl-3-morpholinone polymers that have been mentioned as substrates for the graft copolymers and when mixtures containing predominant proportions of vinyl cyanide with such monomeric materials as vinyl acetate; methyl acrylate; 2-vinyl pyridine; dimethyl aminoethyl acrylate; methacrylonitrile; methacrylamide; acrylic acid; and ethyl acrylate are polymerized in the presence of the preformed, "backbone" N-vinyl-3-morpholinone polymer substrates in the saline solvent.

Thus, fibers of similar quality to those produced in the Fifth and Sixth Illustrations are produced when a copolymer of N-vinyl-3-morpholinone and methyl acrylate or a copolymer of N-vinyl-3-morpholinone and sodium styrene sulfonate is first made and employed as a preformed polymer substrate upon which vinyl cyanide or a copolymerizable mixture of vinyl cyanide and another ethenoid monomer is polymerized in the presence of the N-vinyl-3-morpholinone copolymer "backbone" for the desired resulting graft copolymer products. Good results are achieved in such cases with any preformed copolymeric substrate containing at least about 50, advantageously at least about 80, weight percent of the polymerized N-vinyl-3-morpholinone monomer therein.

Likewise, excellent results commensurate with those demonstrated in the preceding illustrations are also obtained when other N-vinyl-3-morpholinone polymers and copolymers are employed as the preformed "backbone" polymer substrates, such as poly-N-vinyl-5-methyl-3-morpholinone; poly-N-vinyl-5-ethyl-3-morpholinone; poly-N-vinyl-5-chloromethyl-3-morpholinone; poly-N-vinyl-2,6-dimethyl-3-morpholinone; copolymers of N-vinyl-3-morpholinone and N-vinyl-2-pyrrolidone; copolymers of N-vinyl-3-morpholinone and vinyl acetate; copolymers of N-vinyl-5-methyl-3-morpholinone and N-vinyl caprolactam; and so forth, using vinyl cyanide solely or in mixture with other copolymerizable ethenoid monomers containing at least predominant proportions of vinyl cyanide to form the graft copolymer products.

What is claimed is:

1. Method for preparing fiber-forming graft copolymers which comprises: (1) dissolving, in an aqueous saline solution that is a solvent for polyacrylonitrile, (a) an ethylenically unsaturated monomeric material comprising at least a predominant proportion of vinyl cyanide, and (b), a polymer of an ethylenically unsaturated monomeric material containing at least about 50 weight percent of a N-vinyl-3-morpholinone monomer of the structure:

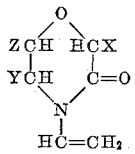

wherein X, Y and Z are each independently selected from the group consisting of hydrogen alkyl and haloalkyl radicals containing from 1 to about 4 carbon atoms; and (2) polymerizing the dissolved monomeric material of (a) in the presence of the dissolved N-vinyl-3-morpholinone polymer to form a graft copolymer-containing polymeric product in spinnable dispersion in said aqueous, polyacrylonitrile-dissolving, saline solution.

2. The method of claim 1, wherein the ethylenically unsaturated monomeric material of (a) consists of vinyl cyanide.

3. The method of claim 1, wherein the ethylenically unsaturated monomeric material of (a) consists of vinyl cyanide which is present in a quantity sufficient to obtain a resulting polymeric product, including graft copolymer therein, that contains at least about 80 weight percent of polymerized vinyl cyanide.

4. The method of claim 1, wherein the ethylenically unsaturated monomeric material of (a) consists of vinyl cyanide which is present in a quantity sufficient to obtain a resulting polymeric product, including graft copolymer therein, that contains at least about 80 weight percent of polymerized vinyl cyanide and wherein the polymer of (b) is poly-N-vinyl-3-morpholinone.

5. The method of claim 1, wherein the ethylenically unsaturated monomeric material of (a) consists of vinyl cyanide which is present in a quantity sufficient to obtain a resulting polymeric product, including graft copolymer therein, that contains at least about 80 weight percent of polymerized vinyl cyanide and wherein the polymer of (b) is a copolymer of N-vinyl-3-morpholinone and a sulfonated styrene monomer.

6. The method of claim 1, wherein the ethylenically unsaturated monomeric material of (a) consists of vinyl cyanide which is present in a quantity sufficient to obtain a resulting polymeric product, including graft copolymer therein, that contains at least about 80 weight percent of polymerized vinyl cyanide and wherein the polymer of (b) is a copolymer of N-vinyl-3-morpholinone and sodium styrene sulfonate.

7. The method of claim 1, wherein the ethylenically unsaturated monomeric material of (a) consists of vinyl cyanide which is present in a quantity sufficient to obtain a resulting polymeric product, including graft copolymer therein, that contains at least about 80 weight percent of polymerized vinyl cyanide and wherein the polymer of (b) is a copolymer of N-vinyl-3-morpholinone and methyl acrylate.

8. The method of claim 1, wherein the ethylenically unsaturated monomeric material of (a) consists essentially of a monomeric mixture of vinyl cyanide and a sulfonated styrene monomer, said vinyl cyanide being present in said monomeric mixture in a quantity sufficient to obtain a resulting polymeric product, including graft copolymer therein, that contains at least about 80 weight percent of polymerized vinyl cyanide and wherein the polymer of (b) is poly-N-vinyl-3-morpholinone.

9. The method of claim 1, wherein the ethylenically unsaturated monomeric material of (a) consists essentially of a monomeric mixture of vinyl cyanide and sodium styrene sulfonate, said vinyl cyanide being present in said monomeric mixture in a quantity sufficient to obtain a resulting polymeric product, including graft copolymer therein, that contains at least about 80 weight percent of polymerized vinyl cyanide and wherein the polymer of (b) is poly-N-vinyl-3-morpholinone.

10. The method of claim 1, wherein the ethylenically unsaturated monomeric material of (a) consists essentially of a monomeric mixture of vinyl cyanide and methyl methacrylate, said vinyl cyanide being present in said monomeric mixture in a quantity sufficient to obtain a resulting polymeric product, including graft copolymer therein, that contains at least about 80 weight percent of polymerized vinyl cyanide and wherein the polymer of (b) is poly-N-vinyl-3-morpholinone.

11. The method of claim 1, wherein said aqueous, polyacrylonitrile-dissolving, saline solution is comprised of zinc chloride.

12. The method of claim 1, wherein said aqueous, polyacrylonitrile-dissolving, saline solution consists essentially of an aqueous solution of zinc chloride that contains at least about 55 weight percent, based on solution weight, of dissolved zinc chloride.

13. The method of claim 1, and including, in addition thereto and in combination therewith, the sequential step of: (3) extruding said graft copolymer-containing, spinnable dispersion into a shaped article in a coagulating liquid for said spinnable dispersion.

14. The method of claim 1, and including, in addition thereto and in combination therewith, the sequential steps of (3a) blending said spinnable dispersion of said graft copolymer-containing polymeric product with another spinnable dispersion of a fiber-forming polymer of an ethylenically unsaturated monomeric material containing at least about 80 weight percent of vinyl cyanide in an aqueous, polyacrylonitrile-dissolving saline solution, said spinnable dispersion of said graft copolymer-containing polymeric product being blended with said other fiber-forming vinyl cyanide polymer dispersion in such proportion that the resulting blended polymer composition contains between about 1 and about 20 weight percent, based on total dispersed blended polymer solids weight, of the N-vinyl-3-morpholinone polymer of (b); then (3) extruding said graft copolymer-containing, spinnable, blended polymer dispersion into a shaped article in a coagulating liquid for said spinnable dispersion.

15. A spinnable, fiber-forming composition comprised of between about 2 and about 20 weight percent, based on composition weight, of a polymeric product containing (A) fiber-forming polymer of an ethylenically unsaturated monomeric material containing at least about 80 weight percent of vinyl cyanide and (B) graft copolymer of (a) an ethylenically unsaturated monomeric material comprising at least about 80 weight percent vinyl cyanide, with (b) a polymer of an ethylenically unsaturated monomeric material containing at least about 50 weight percent of a N-vinyl-3-morpholinone monomer of the structure:

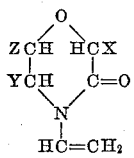

wherein X, Y and Z are each independently selected from the group consisting of hydrogen alkyl and haloalkyl radicals containing from 1 to about 4 carbon atoms; said polymeric product containing polymerized therein between about 1 and 20 weight percent, based on total polymer weight, of said polymer of (b); said polymeric product being uniformly and thoroughly dispersed in spinnable dispersion in an aqueous saline solution that is a solvent for polyacrylonitrile.

16. The composition of claim 15, containing between about 5 and 17 weight percent, based on composition weight, of said dispersed, solid polymeric product.

17. The composition of claim 15, containing between about 6 and 15 weight percent, based on dispersed polymer solids weight, of said polymer of (b).

18. The composition of claim 15, wherein said polymeric product is the product of polymerization of vinyl cyanide with poly-N-vinyl-3-morpholinone and said composition is a solution.

19. The composition of claim 15, wherein the polymer of (b) is poly-N-vinyl-3-morpholinone and wherein the polymeric product contains about 90 weight percent of vinyl cyanide polymerized therein.

20. The composition of claim 15, wherein said polymeric product is the product of polymerization of a monomeric mixture of at least about 80 weight percent, based on mixture weight, of vinyl cyanide and a sulfonated styrene monomer with poly-N-vinyl-3-morpholinone and said composition is a solution.

21. The composition of claim 15, wherein said polymeric product is the product of polymerization of a mixture of at least about 80 weight percent, based on mixture weight, of vinyl cyanide and methyl methacrylate with poly-N-vinyl-3-morpholinone and said composition is a solution.

22. Graft copolymer of (I) between about 80 and about 99 weight percent, based on graft copolymer weight, of an ethylenically unsaturated monomeric material comprising at least about 80 weight percent, based on monomeric material weight, of vinyl cyanide, and (II) between about 20 and about 1 weight percent, based on graft copolymer weight, of a polymer of an ethylenically unsaturated monomeric material containing at least about 50 weight percent of a N-vinyl-3-morpholinone monomer of the structure:

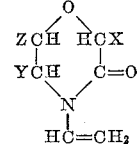

wherein X, Y and Z are each independently selected from the group consisting of hydrogen alkyl annd haloalkyl radicals containing from 1 to about 4 carbon atoms.

23. The graft copolymer of claim 22, wherein said monomeric material of (I) is vinyl cyanide and said polymer of (II) is a copolymer of N-vinyl-3-morpholinone and a sulfonated alkenyl aromatic monomer selected from the group consisting of sulfonated styrene monomers and sulfonated vinyl toluene monomers.

24. Graft copolymer of between about 85 and 94 weight percent, based on graft copolymer weight, of vinyl cyanide and between about 15 and 6 weight percent, based on graft copolymer weight, of poly-N-vinyl-3-morpholinone.

25. The graft copolymer of claim 22, wherein said monomeric material of (I) is a mixture of vinyl cyanide and a sulfonated alkenyl aromatic monomer and said polymer of (II) is a copolymer of N-vinyl-3-morpholinone and a sulfonated alkenyl aromatic monomer selected from the group consisting of sulfonated styrene monomers and sulfonated vinyl toluene monomers.

26. The graft copolymer of claim 22, wherein said monomeric material of (I) is a mixture of vinyl cyanide and a sulfonated styrene monomer and said polymer of (II) is a copolymer of N-vinyl-3-morpholinone and a sulfonated alkenyl aromatic monomer selected from the group consisting of sulfonated styrene monomers and sulfonated vinyl toluene monomers.

27. The graft copolymer of claim 22, wherein said monomeric material of (I) is a mixture of vinyl cyanide and sodium styrene sulfonate and said polymer of (II) is a copolymer of N-vinyl-3-morpholinone and a sulfonated alkenyl aromatic monomer selected from the group consisting of sulfonated styrene monomers and sulfonated vinyl toluene monomers.

28. The graft copolymer of claim 22, wherein said monomeric material of (I) is a mixture of vinyl cyanide and methyl acrylate and said polymer of (II) is a copolymer of N-vinyl-3-morpholinone and a sulfonated alkenyl aromatic monomer selected from the group consisting of sulfonated styrene monomers and sulfonated vinyl toluene monomers.

29. A filamentary shaped article comprised of the graft copolymer of claim 22.

References Cited in the file of this patent
UNITED STATES PATENTS 2,948,708    Walles et al.            Aug. 9, 1960
2,949,435    Davis et al.            Aug. 16, 1960